(12) United States Patent
Grenfell et al.

(10) Patent No.: US 9,208,361 B1
(45) Date of Patent: Dec. 8, 2015

(54) MAGNETIC STRIPE CARD READER

(71) Applicant: VERIFONE INC., San Jose, CA (US)

(72) Inventors: Jack Richard Grenfell, Rocklin, CA (US); V Neelakantan, Nevada City, CA (US); Michael Schmid, Rocklin, CA (US)

(73) Assignee: VERIFONE INC., San Jose, CA (US)

( * ) Notice: Subject to any disclaimer, the term of this patent is extended or adjusted under 35 U.S.C. 154(b) by 0 days.

(21) Appl. No.: 14/575,307

(22) Filed: Dec. 18, 2014

(51) Int. Cl.
*G06K 7/08* (2006.01)

(52) U.S. Cl.
CPC ........................... *G06K 7/084* (2013.01)

(58) Field of Classification Search
CPC .............................................. G11B 20/10009
USPC .................................................. 235/440, 449
See application file for complete search history.

(56) References Cited

U.S. PATENT DOCUMENTS

| | | | |
|---|---|---|---|
| 3,508,031 A | 4/1970 | Cooper | |
| 4,245,268 A * | 1/1981 | Toshimitsu | 360/125.12 |
| 4,849,616 A | 7/1989 | Mizote | |
| 4,984,117 A | 1/1991 | Nolke et al. | |
| 5,204,513 A | 4/1993 | Steele | |
| 5,285,328 A | 2/1994 | Behr et al. | |
| 6,254,005 B1 | 7/2001 | Smith et al. | |
| 6,279,827 B1 * | 8/2001 | Yeckley | 235/449 |
| 6,830,182 B2 | 12/2004 | Izuyama | |
| 6,853,093 B2 | 2/2005 | Cohen et al. | |
| 7,185,806 B2 | 3/2007 | Sines | |
| 7,309,012 B2 | 12/2007 | Von Mueller et al. | |
| 7,451,923 B2 | 11/2008 | Sines | |
| 7,497,378 B2 | 3/2009 | Aviv | |
| 7,552,865 B2 | 6/2009 | Varadarajan et al. | |
| 7,753,275 B2 | 7/2010 | Schulz | |
| 7,784,691 B2 | 8/2010 | Mirkazemi-Moud et al. | |
| 7,866,556 B2 | 1/2011 | Pedigo et al. | |
| 7,886,976 B2 | 2/2011 | Leong et al. | |

(Continued)

FOREIGN PATENT DOCUMENTS

| | | |
|---|---|---|
| EP | 0565759 | 10/1993 |
| JP | 57127967 | 8/1982 |

(Continued)

OTHER PUBLICATIONS

U.S. Appl. No. 60/994,951, filed Sep. 20, 2007.

(Continued)

*Primary Examiner* — Jamara Franklin
(74) *Attorney, Agent, or Firm* — Sughrue Mion, PLLC

(57) ABSTRACT

A magnetic stripe card reader useful for reading magnetic stripe bearing cards having at least one magnetic track, the magnetic stripe reader including a magnetic stripe reader head including multiple magnetic sensors including at least one magnetic track reading sensor for reading data encoded in a magnetic track of a magnetic stripe and at least one magnetic sensor which does not read encoded data, the magnetic stripe reader head providing magnetic sensor outputs including at least one magnetic track sensor reading output and at least one magnetic sensor output which has no encoded data therein and a subtractor operative to subtract at least a portion of the at least one magnetic sensor output, which has no encoded data therein, from the at least one magnetic track sensor reading output having card data encoded thereon, thereby to cancel interference from the at least one magnetic track reading output.

17 Claims, 3 Drawing Sheets

(56) References Cited

U.S. PATENT DOCUMENTS

| | | |
|---|---|---|
| 7,898,413 B2 | 3/2011 | Hsu et al. |
| 2002/0032657 A1 | 3/2002 | Singh |
| 2005/0219728 A1 | 10/2005 | Durbin et al. |
| 2005/0234715 A1 | 10/2005 | Ozawa |
| 2006/0032906 A1 | 2/2006 | Sines |
| 2007/0090181 A1 | 4/2007 | Varadarajan et al. |
| 2007/0152052 A1 | 7/2007 | Sines |
| 2008/0135617 A1 | 6/2008 | Aviv |
| 2008/0180245 A1 | 7/2008 | Hsu et al. |
| 2008/0315989 A1 | 12/2008 | Mirkazemi-Moud et al. |
| 2009/0072033 A1 | 3/2009 | Schulz |
| 2009/0078764 A1 | 3/2009 | Pedigo et al. |
| 2009/0078765 A1 | 3/2009 | Leong et al. |

FOREIGN PATENT DOCUMENTS

| | | |
|---|---|---|
| JP | 58009257 | 1/1983 |
| JP | 60170068 | 9/1985 |
| JP | 62102492 | 5/1987 |
| JP | 2126385 | 5/1990 |
| JP | 2126386 | 5/1990 |
| JP | 3012060 | 1/1991 |
| JP | 3251976 | 11/1991 |
| JP | 5266318 | 10/1993 |
| JP | 6146677 | 5/1994 |
| JP | 8335253 | 12/1996 |

OTHER PUBLICATIONS

An Office Action dated Jun. 25, 2010, which issued during the prosecution of U.S. Appl. No. 11/965,957.

An Office Action dated Jun. 25, 2010, which issued during the prosecution of U.S. Appl. No. 11/965,908.

Notice of Allowance dated Nov. 1, 2010, which issued during the prosecution of U.S. Appl. No. 11/965,908.

Notice of Allowance dated Nov. 18, 2010, which issued during the prosecution of U.S. Appl. No. 11/965,957.

* cited by examiner

MAGNETIC STRIPE CARD READER

FIELD OF THE INVENTION

The present invention relates to magnetic stripe card readers.

BACKGROUND OF THE INVENTION

Various types of magnetic stripe card readers are known.

SUMMARY OF THE INVENTION

The present invention seeks to provide an improved magnetic stripe card reader.

There is thus provided in accordance with a preferred embodiment of the present invention a magnetic stripe card reader useful for reading magnetic stripe bearing cards having at least one magnetic track, the magnetic stripe reader including a magnetic stripe reader head including multiple magnetic sensors including at least one magnetic track reading sensor for reading data encoded in a magnetic track of a magnetic stripe and at least one magnetic sensor which does not read encoded data, the magnetic stripe reader head providing magnetic sensor outputs including at least one magnetic track sensor reading output and at least one magnetic sensor output which has no encoded data therein and a subtractor operative to subtract at least a portion of the at least one magnetic sensor output, which has no encoded data therein, from the at least one magnetic track sensor reading output having card data encoded thereon, thereby to cancel interference from the at least one magnetic track reading output.

Preferably, the subtractor provides an interference adjusted output to a processor which is not part of the magnetic stripe card reader. In accordance with a preferred embodiment of the present invention the magnetic stripe card reader also includes a processor and the subtractor provides an interference adjusted output to the processor.

There is also provided in accordance with another preferred embodiment of the present invention a point of sale device including a housing, a processor and a magnetic stripe card reader useful for reading magnetic stripe bearing cards having at least one magnetic track, the magnetic stripe reader including a magnetic stripe reader head including multiple magnetic sensors including at least one magnetic track reading sensor for reading data encoded in a magnetic track of a magnetic stripe and at least one magnetic sensor which does not read encoded data, the magnetic stripe reader head providing magnetic sensor outputs including at least one magnetic track sensor reading output and at least one magnetic sensor output which has no encoded data therein and a subtractor operative to subtract at least a portion of the at least one magnetic sensor output, which has no encoded data therein, from the at least one magnetic track sensor reading output having card data encoded thereon, thereby to cancel interference from the at least one magnetic track reading output and to provide an interference adjusted output to the processor.

There is further provided in accordance with yet another preferred embodiment of the present invention a point of sale device including a housing and a magnetic stripe card reader useful for reading magnetic stripe bearing cards having at least one magnetic track, the magnetic stripe reader including a processor, a magnetic stripe reader head including multiple magnetic sensors including at least one magnetic track reading sensor for reading data encoded in a magnetic track of a magnetic stripe and at least one magnetic sensor which does not read encoded data, the magnetic stripe reader head providing magnetic sensor outputs including at least one magnetic track sensor reading output and at least one magnetic sensor output which has no encoded data therein and a subtractor operative to subtract at least a portion of the at least one magnetic sensor output, which has no encoded data therein, from the at least one magnetic track sensor reading output having card data encoded thereon, thereby to cancel interference from the at least one magnetic track reading output and to provide an interference adjusted output to the processor.

Preferably, the magnetic sensor output, which has no encoded data thereon, is produced by reading a location on the magnetic stripe bearing card which corresponds to a location where a third track could have been encoded on the stripe. Alternatively, the magnetic sensor output, which has no encoded data thereon, is produced by reading a location on the magnetic stripe bearing card which corresponds to a location where a fourth track could have been encoded on the stripe.

In accordance with a preferred embodiment of the present invention the at least one magnetic sensor which does not read encoded data forms part of the magnetic stripe reader head. Alternatively, the at least one magnetic sensor which does not read encoded data does not form part of the magnetic stripe reader head.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
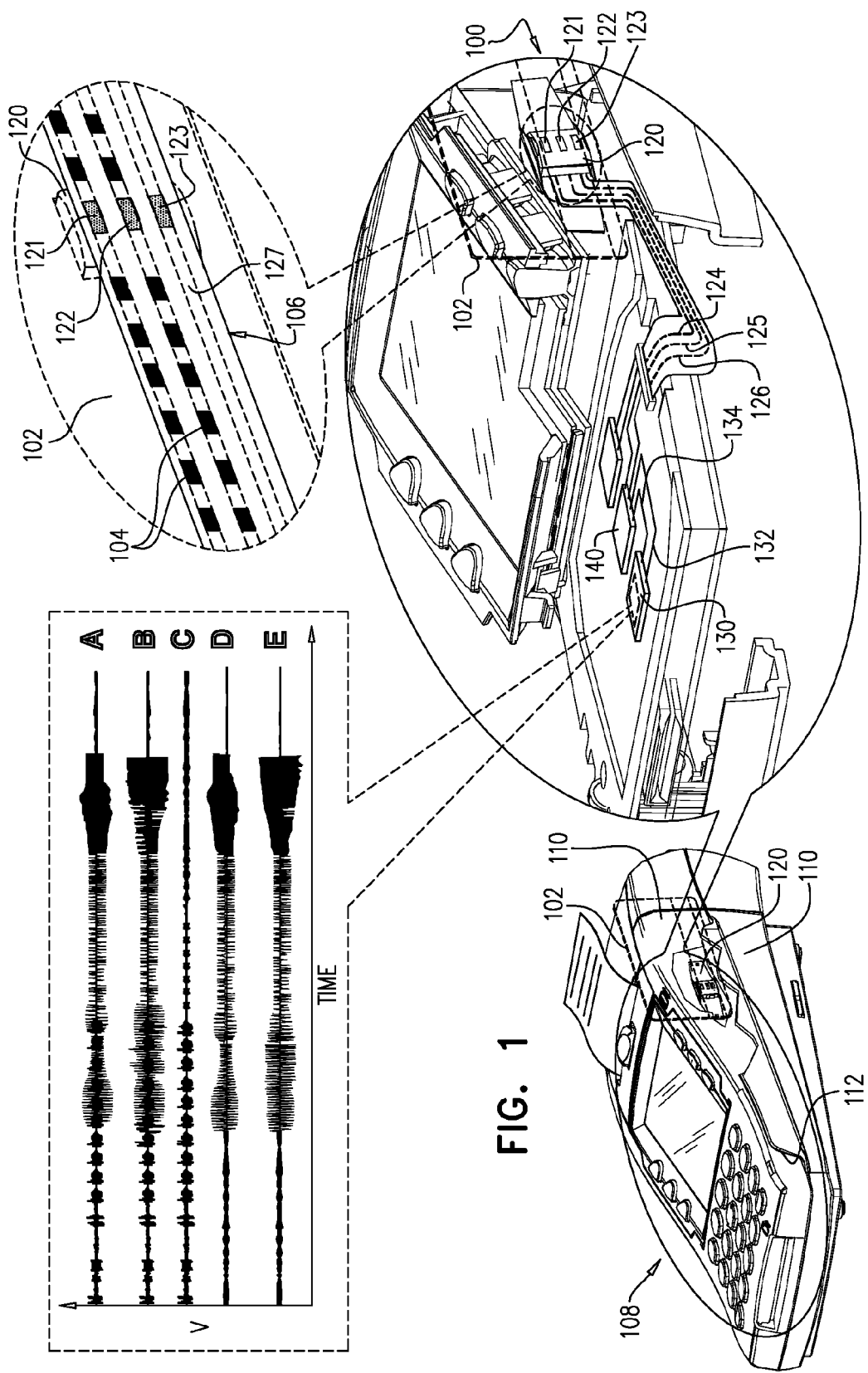
FIG. 1 is a simplified illustration of a noise cancelling magnetic stripe card reader constructed and operative in accordance with one embodiment of the present invention.

Reference is now made to FIG. 1, which is a simplified illustration of a noise cancelling magnetic stripe card reader constructed and operative in accordance with one embodiment of the present invention. As seen in FIG. 1, there is provided a magnetic stripe card reader 100, useful for reading conventional magnetic stripe bearing cards 102 having multiple magnetic track locations 104 on a magnetic stripe 106. Track locations 104 are typically fixed by international standards. It is appreciated that, depending on the precise application of a card 102, data may or may not be encoded at some of the magnetic track locations 104. Furthermore, depending on the precise application of a card 102, magnetic material may or may not be located at some of the magnetic track locations 104.

The magnetic stripe card reader 100 is preferably incorporated in or associated with a point of sale (POS) device 108, such as the MX and VX Series and Ruby SuperSystem commercially available from Verifone Inc., the assignee of the present application. The magnetic stripe card reader 100 preferably includes a housing 110, which may be part of the housing of the POS device 108, which defines a slot 112 through which the card 102 is slid for being read.

In accordance with a preferred embodiment of the present invention, the magnetic stripe card reader 100 comprises a conventional magnetic stripe reader head 120 including typically three magnetic track reading sensors 121, 122 and 123. The magnetic stripe reader head 120 communicates with slot 112, typically via an aperture (not shown) in housing 110. Magnetic track reading sensors 121, 122 and 123 are arranged to read data encoded at the multiple magnetic track locations 104.

Conventional magnetic stripe reader heads are commercially available from various manufacturers including, inter alia, MTI, Techreco, Brush, Apollo and Durascan and preferably comply with the ISO/IEC 7811 standard. Sensors 121, 122 and 123 are arranged to provide respective outputs 124, 125 and 126, each sensor being located opposite a different magnetic track location 104.

In accordance with a preferred embodiment of the present invention, sensor 123 is preferably arranged to be opposite a track location 127 at which no encoded data is encoded on the cards 102 to be read. In such a case, sensor 123 provides a sensor output 126 which does not represent encoded data on a track but rather only represents electromagnetic noise sensed in the vicinity of head 120. It is thus understood that sensor output 126 represents electromagnetic noise which occurs during the same time as the remaining sensors 121 and 122 read magnetic tracks which have data encoded thereon. Typical sensor outputs 124 and 125 are labeled A and B in FIG. 1 and a typical sensor output 126 is labeled C in FIG. 1.

Magnetic stripe reading sensor outputs 124, 125 and 126 are preferably supplied to a subtractor 130, which may be incorporated in a processor having other functions in the POS device 108 or in the card reader 100 and which is operative to subtract at least part of the sensor output 126 from sensor 123 from the outputs 124 and 125 of respective sensors 121 and 122, which outputs represent the data read from magnetic track locations 104 having data encoded thereon. This subtraction is operative to cancel some, most or all of the electromagnetic interference (EMI), such as interference from adjacent electronic circuitry, from the magnetic stripe reading sensor outputs 124 and 125.

It is appreciated that subtractor 130 may be embodied in hardware, software or any suitable combination thereof, as is well known in the art and preferably performs adaptive noise cancellation.

Outputs 132 and 134 of the subtractor 130, which represent data read from magnetic track locations 104 having data encoded thereon, from which electromagnetic interference (EMI) has been at least partly canceled, are supplied to a processor 140, which typically forms part of the POS device 108, as magnetic card reading inputs for conventional purposes. Typical outputs 132 and 134, which have been "cleaned" of at least some EMI noise are labeled D and E in FIG. 1 and correspond respectively to sensor outputs A and B.

Figure 2:
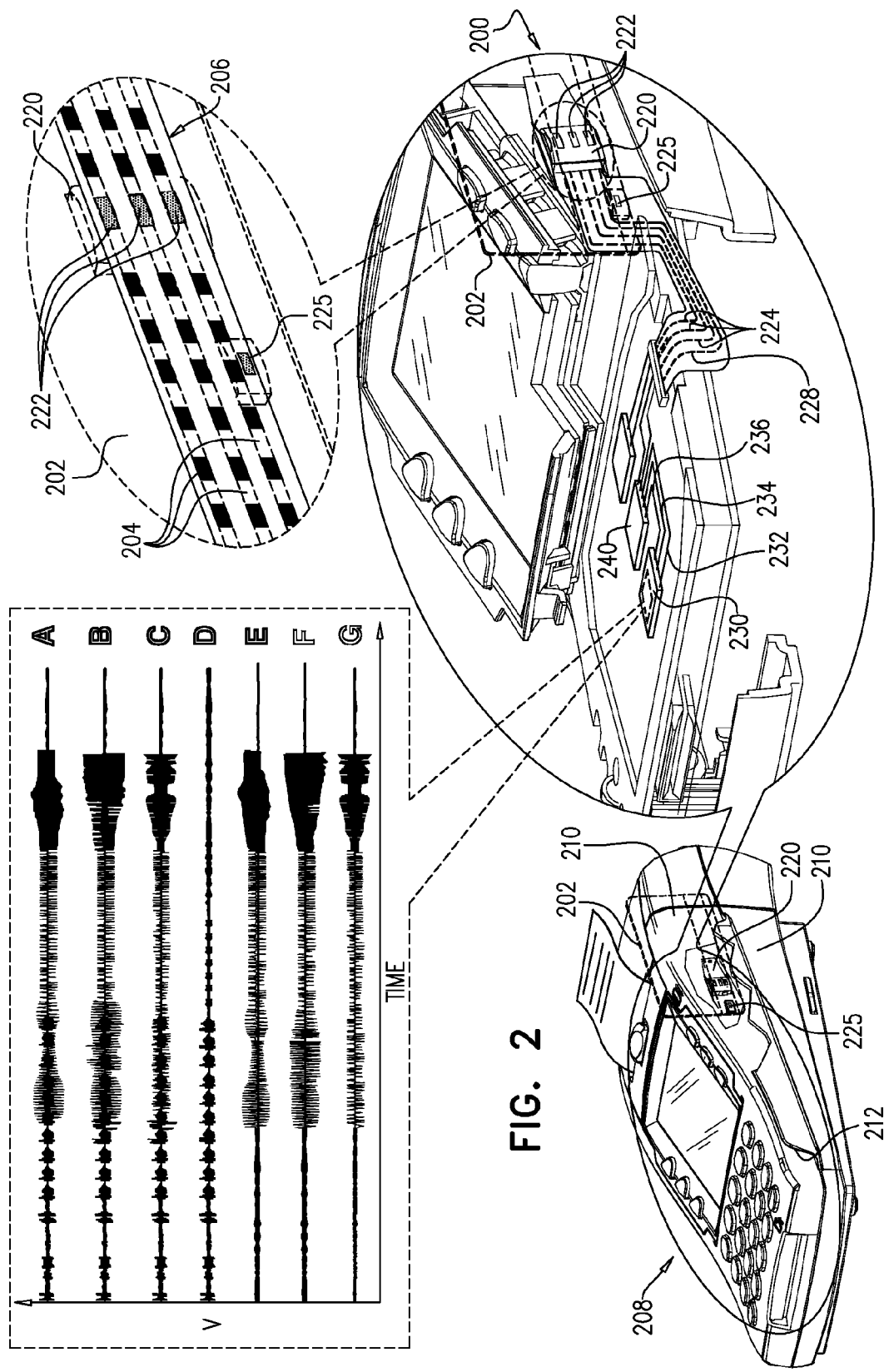
FIG. 2 is a simplified illustration of a noise cancelling magnetic stripe card reader constructed and operative in accordance with another embodiment of the present invention.

Reference is now made to FIG. 2, which is a simplified illustration of a noise cancelling magnetic stripe card reader constructed and operative in accordance with another embodiment of the present invention. As seen in FIG. 2, there is provided a magnetic stripe card reader 200, useful for reading conventional magnetic stripe bearing cards 202 having multiple magnetic track locations 204 on a magnetic stripe 206. Track locations 204 are typically fixed by international standards. It is appreciated that, depending on the precise application of a card 202, data may or may not be encoded at some of the magnetic track locations. Furthermore, depending on the precise application of a card 202, magnetic material may or may not be located at some of the magnetic track locations 204.

The magnetic stripe card reader 200 is preferably incorporated in or associated with a point of sale (POS) device 208, such as the MX and VX Series and Ruby SuperSystem commercially available from Verifone Inc., the assignee of the present application. The magnetic stripe card reader 200 preferably includes a housing 210, which may be part of the housing of the POS device 208, which defines a slot 212 through which the card 202 is slid for being read.

In accordance with a preferred embodiment of the present invention, the magnetic stripe card reader 200 comprises a conventional magnetic stripe reader head 220 including typically three magnetic track reading sensors 222. The magnetic stripe reader head 220 communicates with slot 212, typically via an aperture (not shown) in housing 210. Magnetic track reading sensors 222 are arranged to read data encoded at the multiple magnetic track locations 204.

Conventional magnetic stripe reader heads are commercially available from various manufacturers including, inter alia, MTI, Techreco, Brush, Apollo and Durascan and preferably comply with the ISO/IEC 7811 standard. Sensors 222 are arranged to provide respective outputs 224, each sensor 222 being located opposite a different magnetic track location 204. In this embodiment, all three sensors 222 read data encoded at all three track locations 204 and provide corresponding outputs 224.

In accordance with this embodiment of the present invention, there is provided an additional sensor 225, which is preferably arranged to be opposite a location on card 202 which does not correspond to a track location but could or could not have been a fourth track location. Sensor 225 may or may not be part of a conventional magnetic reading head. In such a case, sensor 225 provides a sensor output 228 which does not represent encoded data on a track but rather only represents electromagnetic noise sensed in the vicinity of head 220. It is thus understood that sensor output 228 represents electromagnetic noise which occurs during the same time as the remaining sensors 222 read magnetic tracks which have data encoded thereon. Typical sensor outputs 224 are labeled A, B and C in FIG. 2 and a typical sensor output 228 is labeled D in FIG. 2.

Magnetic stripe reading sensor outputs 224 and 228 are preferably supplied to a subtractor 230, which may be incorporated in a processor having other functions in the POS device 208 or in the card reader 200 and which is operative to subtract at least part of the sensor output 228 from sensor 225 from the outputs 224 from sensors 222, which outputs 224 represent the data read from magnetic track locations 204 having data encoded thereon. This subtraction is operative to cancel some, most or all of the electromagnetic interference (EMI), such as interference from adjacent electronic circuitry, from the magnetic stripe reading sensor outputs 224.

It is appreciated that subtractor 230 may be embodied in hardware, software or any suitable combination thereof, as is well known in the art and preferably performs adaptive noise cancellation.

Outputs 232, 234 and 236 of the subtractor 230, which represent data read from magnetic track locations 204 having data encoded thereon, from which electromagnetic interference (EMI) has been at least partly canceled, are supplied to a processor 240, which typically forms part of the POS device 208, as magnetic card reading inputs for conventional purposes. Typical outputs 232, 234 and 236, which have been "cleaned" of at least some EMI noise, are labeled E, F and G in FIG. 2 and correspond respectively to sensor outputs A, B and C.

Figure 3:
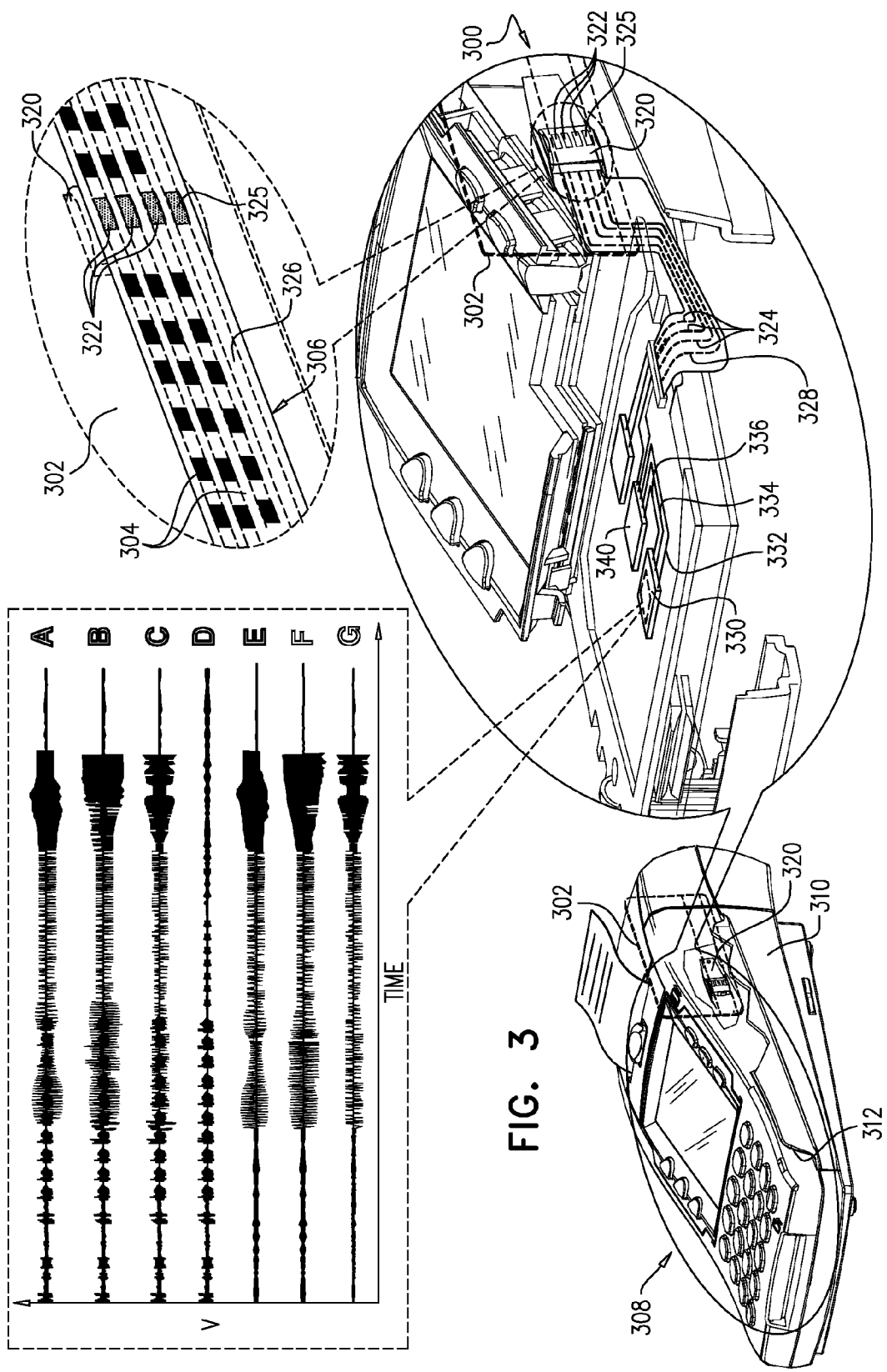
FIG. 3 is a simplified illustration of a noise cancelling magnetic stripe card reader constructed and operative in accordance with yet another embodiment of the present invention.

Reference is now made to FIG. 3, which is a simplified illustration of a noise cancelling magnetic stripe card reader constructed and operative in accordance with yet another embodiment of the present invention. As seen in FIG. 3, there is provided a magnetic stripe card reader 300, useful for reading conventional magnetic stripe bearing cards 302 having multiple magnetic track locations 304 on a magnetic stripe 306. Track locations 304 are typically fixed by international standards. It is appreciated that depending on the precise application of a card 302, data may or may not be encoded at some of the magnetic track locations 304. Furthermore, depending on the precise application of a card 302, magnetic material may or may not be located at some of the magnetic track locations 304.

The magnetic stripe card reader 300 is preferably incorporated in or associated with a point of sale (POS) device 308, such as the MX and VX Series and Ruby SuperSystem commercially available from Verifone Inc., the assignee of the present application. The magnetic stripe card reader 300 preferably includes a housing 310, which may be part of the housing of the POS device 308, which defines a slot 312 through which the card 302 is slid for being read.

In accordance with a preferred embodiment of the present invention, the magnetic stripe card reader 300 comprises a non-conventional magnetic stripe reader head 320 including typically three magnetic track reading sensors 322. The magnetic stripe reader head 320 communicates with slot 312, typically via an aperture (not shown) in housing 310. Magnetic track reading sensors 322 are arranged to read data encoded at the multiple magnetic track locations 304.

Magnetic stripe reader head 320 preferably includes sensors 322, which are arranged to provide respective outputs 324, each sensor 322 being located opposite a different magnetic track location 304.

In accordance with a preferred embodiment of the present invention, the magnetic stripe reader head 320 preferably also includes a sensor 325, which is preferably arranged to be opposite a location 326 which is not a track location 304 and at which no data is encoded on the cards to be read. Location 326 could or could not have been a fourth track location. In such a case, sensor 325 provides a sensor output 328 which does not represent encoded data on a track but rather only represents electromagnetic noise sensed in the vicinity of head 320. It is thus understood that sensor output 328 represents electromagnetic noise which occurs during the same time as the remaining sensors 322 read magnetic tracks which have data encoded thereon. Typical sensor outputs 324 are labeled A, B and C in FIG. 3 and a typical sensor output 328 is labeled D in FIG. 3.

Magnetic stripe reading sensor outputs 324 and 328 are preferably supplied to a subtractor 330, which may be incorporated in a processor having other functions in the POS device 308 or in the card reader 300 and which is operative to subtract at least part of the sensor output 328 from sensor 325 from the outputs 324 from sensors 322, which outputs represent the data read from magnetic track locations 304 having data encoded thereon. This subtraction is operative to cancel some, most or all of the electromagnetic interference (EMI), such as interference from adjacent electronic circuitry, from the magnetic stripe reading sensor outputs 324.

It is appreciated that subtractor 330 may be embodied in hardware, software or any suitable combination thereof, as is well known in the art and preferably performs adaptive noise cancellation.

Outputs 332, 334 and 336 of the subtractor 330, which represent data read from magnetic track locations 304 having data encoded thereon, from which electromagnetic interference (EMI) has been at least partly canceled, are supplied to a processor 340, which typically forms part of the POS device 308, as magnetic card reading inputs for conventional purposes. Typical outputs 332, 334 and 336, which have been "cleaned" of at least some EMI noise are labeled E, F and G in FIG. 3 and correspond respectively to sensor outputs A, B and C.

It will be appreciated by persons skilled in the art that the present invention is not limited by that specifically described and shown hereinabove and in the drawings but includes also variations and modifications thereof which would occur to persons skilled in the art upon reading the foregoing and which are not in the prior art.

The invention claimed is:

1. A magnetic stripe card reader useful for reading magnetic stripe bearing cards having at least one magnetic track, said magnetic stripe reader comprising:
   a magnetic stripe reader head comprising multiple magnetic sensors including at least one magnetic track reading sensor for reading data encoded in a magnetic track of a magnetic stripe and at least one magnetic sensor which does not read encoded data, said magnetic stripe reader head providing magnetic sensor outputs including at least one magnetic track sensor reading output and at least one magnetic sensor output which has no encoded data therein; and
   a subtractor operative to subtract at least a portion of said at least one magnetic sensor output, which has no encoded data therein, from said at least one magnetic track sensor reading output having card data encoded thereon, thereby to cancel interference from said at least one magnetic track reading output.

2. A magnetic stripe card reader according to claim 1 and wherein said magnetic sensor output, which has no encoded data thereon, is produced by reading a location on said magnetic stripe bearing card which corresponds to a location where a third track could have been encoded on the stripe.

3. A magnetic stripe card reader according to claim 1 and wherein said magnetic sensor output, which has no encoded data thereon, is produced by reading a location on said magnetic stripe bearing card which corresponds to a location where a fourth track could have been encoded on the stripe.

4. A magnetic stripe card reader according to claim 1 and wherein said at least one magnetic sensor which does not read encoded data forms part of said magnetic stripe reader head.

5. A magnetic stripe card reader according to claim 1 and wherein said at least one magnetic sensor which does not read encoded data does not form part of said magnetic stripe reader head.

6. A magnetic stripe card reader according to claim 1 and wherein said subtractor provides an interference adjusted output to a processor which is not part of said magnetic stripe card reader.

7. A magnetic stripe card reader according to claim 1 and also comprising a processor and wherein said subtractor provides an interference adjusted output to said processor.

8. A point of sale device comprising:
   a housing;
   a processor; and
   a magnetic stripe card reader useful for reading magnetic stripe bearing cards having at least one magnetic track, said magnetic stripe reader comprising:
      a magnetic stripe reader head comprising multiple magnetic sensors including at least one magnetic track reading sensor for reading data encoded in a magnetic track of a magnetic stripe and at least one magnetic sensor which does not read encoded data, said magnetic stripe reader head providing magnetic sensor outputs including at least one magnetic track sensor reading output and at least one magnetic sensor output which has no encoded data therein; and a subtractor operative to subtract at least a portion of said at least one magnetic sensor output, which has no encoded data therein, from said at least one magnetic track sensor reading output having card data encoded thereon, thereby to cancel interference from said at least one magnetic track reading output and to provide an interference adjusted output to said processor.

9. A point of sale device according to claim 8 and wherein said magnetic sensor output, which has no encoded data thereon, is produced by reading a location on said magnetic stripe bearing card which corresponds to a location where a third track could have been encoded on the stripe.

10. A point of sale device according to claim 8 and wherein said magnetic sensor output, which has no encoded data thereon, is produced by reading a location on said magnetic stripe bearing card which corresponds to a location where a fourth track could have been encoded on the stripe.

11. A point of sale device according to claim 8 and wherein said at least one magnetic sensor which does not read encoded data forms part of said magnetic stripe reader head.

12. A point of sale device according to claim 8 and wherein said at least one magnetic sensor which does not read encoded data does not form part of said magnetic stripe reader head.

13. A point of sale device comprising:

a housing; and a magnetic stripe card reader useful for reading magnetic stripe bearing cards having at least one magnetic track, said magnetic stripe reader comprising:

a processor;

a magnetic stripe reader head comprising multiple magnetic sensors including at least one magnetic track reading sensor for reading data encoded in a magnetic track of a magnetic stripe and at least one magnetic sensor which does not read encoded data, said magnetic stripe reader head providing magnetic sensor outputs including at least one magnetic track sensor reading output and at least one magnetic sensor output which has no encoded data therein; and a subtractor operative to subtract at least a portion of said at least one magnetic sensor output, which has no encoded data therein, from said at least one magnetic track sensor reading output having card data encoded thereon, thereby to cancel interference from said at least one magnetic track reading output and to provide an interference adjusted output to said processor.

14. A point of sale device according to claim 13 and wherein said magnetic sensor output, which has no encoded data thereon, is produced by reading a location on said magnetic stripe bearing card which corresponds to a location where a third track could have been encoded on the stripe.

15. A point of sale device according to claim 13 and wherein said magnetic sensor output, which has no encoded data thereon, is produced by reading a location on said magnetic stripe bearing card which corresponds to a location where a fourth track could have been encoded on the stripe.

16. A point of sale device according to claim 13 and wherein said at least one magnetic sensor which does not read encoded data forms part of said magnetic stripe reader head.

17. A point of sale device according to claim 13 and wherein said at least one magnetic sensor which does not read encoded data does not form part of said magnetic stripe reader head.

* * * * *